US012458082B2

(12) United States Patent
Orloff et al.

(10) Patent No.: US 12,458,082 B2
(45) Date of Patent: Nov. 4, 2025

(54) ANTI-FOGGING FACEMASK

(71) Applicant: TearDX LLC, Bayside, NY (US)

(72) Inventors: Eugene Orloff, Bayside, NY (US); Paul V. Braun, Champaign, IL (US); Eric Scott Epstein, Pittsburgh, PA (US)

(73) Assignee: TearDX LLC, Bayside, NY (US)

( * ) Notice: Subject to any disclaimer, the term of this patent is extended or adjusted under 35 U.S.C. 154(b) by 346 days.

(21) Appl. No.: 18/105,521

(22) Filed: Feb. 3, 2023

(65) Prior Publication Data

US 2023/0180863 A1 Jun. 15, 2023

Related U.S. Application Data

(63) Continuation-in-part of application No. 17/701,441, filed on Mar. 22, 2022.

(60) Provisional application No. 63/164,070, filed on Mar. 22, 2021.

(51) Int. Cl.

| | |
|---|---|
| ***A41D 13/11*** | (2006.01) |
| ***A41D 27/28*** | (2006.01) |
| ***A41D 31/14*** | (2019.01) |
| ***A62B 23/02*** | (2006.01) |

(52) U.S. Cl.

CPC ...... *A41D 13/1107* (2013.01); *A41D 13/1169* (2013.01); *A41D 27/28* (2013.01); *A41D 31/14* (2019.02); *A62B 23/025* (2013.01)

(58) Field of Classification Search

CPC ................ A41D 13/11; A41D 13/1107; A41D 13/1138; A41D 13/1168; A41D 13/1169; A62B 18/025; A62B 23/025

See application file for complete search history.

(56) References Cited

U.S. PATENT DOCUMENTS

| | | | | |
|---|---|---|---|---|
| 5,727,544 | A * | 3/1998 | Miura | A41D 13/11 128/206.16 |
| 9,463,340 | B1 * | 10/2016 | Epstein | A41D 13/11 |
| 9,468,783 | B1 * | 10/2016 | Epstein | B05D 5/00 |
| 11,213,702 | B1 * | 1/2022 | Scheiner | A62B 18/08 |
| 2003/0221690 | A1 * | 12/2003 | Lee | A62B 9/003 128/206.13 |
| 2010/0076532 | A1 * | 3/2010 | Matich | A41D 13/0055 2/9 |
| 2011/0296584 | A1 * | 12/2011 | Kuo | A62B 23/025 2/206 |
| 2020/0397087 | A1 * | 12/2020 | Crenshaw | A41D 1/002 |
| 2022/0032096 | A1 * | 2/2022 | Augustine | B01D 46/10 |
| 2022/0152434 | A1 * | 5/2022 | Ninaber | A62B 18/025 |
| 2023/0113123 | A1 * | 4/2023 | Seok | A41D 13/11 128/863 |

* cited by examiner

*Primary Examiner* — Keri J Nelson

(74) *Attorney, Agent, or Firm* — Herbert Smith Freehills Kramer (US) LLP

(57) ABSTRACT

An anti-fogging facemask for preventing fogging of the wearer's glasses or goggles is described herein. The anti-fogging facemask includes an outer facemask and an inner facemask. The inner facemask is attached to the outer facemask. The inner facemask provides a barrier to prevent exhaled air from traveling through the upper end of the facemask. The inner facemask directs exhaled air downwards. The outer facemask forms a seal at an upper portion of the wearer's nose. The facemask may be configured to serve as a CO2 concentrating mask for temporary relief of allergic rhinitis symptoms.

17 Claims, 5 Drawing Sheets

ANTI-FOGGING FACEMASK

CROSS-REFERENCE TO RELATED APPLICATIONS

This application is a Continuation in Part (CIP) of U.S. Non-Provisional application Ser. No. 17/701,441, filed Mar. 22, 2022, which claims the benefit of U.S. Provisional Application No. 63/164,070, filed Mar. 22, 2021, the disclosure of which is hereby incorporated by reference as if fully set forth.

FIELD OF INVENTION

This application is in the fields of disease transmission prevention and treatment of allergies.

BACKGROUND

Conventional facemasks form an imperfect seal near the bridge of the nose, a condition which tends to worsen over repeated uses of the mask. This creates a major problem for people wearing eyeglasses, sun glasses, or safety goggles throughout the day, as moisture from exhaled breath causes eyewear to continually fog up. Solutions that currently exist are antifogging spray for glasses or facemasks made out of water absorbing materials such as cotton. Neither of these solutions is effective at solving the problem.

Studies have shown that intranasal application of carbon dioxide may reduce symptoms of allergic rhinitis, for example, aiding in the abortive treatment of migraines. Direct application of 1.2 L of CO2 split between 2 nostrils over the course of 2 minutes may be sufficient to have rapid (for example, within 10 minutes) and sustained (for example, over a 24 hour period) relief from symptoms of allergic rhinitis. In some trials, CO2 was administered using compressed gas cylinders. And although effective, this is not a practical treatment for use outside of a doctors' office. A more practical solution to reduce the symptoms of allergic rhinitis may be to increase a concentration of exhaled CO2 within the nasal cavity. As such, a need exists to be able to safely and conveniently concentrate CO2 within the nasal cavity.

SUMMARY

An anti-fogging facemask for preventing fogging of the wearer's glasses or goggles is described herein. The anti-fogging facemask includes an outer facemask and an inner facemask. The inner facemask is attached to the outer facemask. The inner facemask provides a barrier to prevent exhaled air from traveling through the upper end of the facemask. The inner facemask directs exhaled air downwards. The outer facemask forms a seal at an upper portion of the wearer's nose. The anti-fogging facemask may be configured to also serve as a CO2 concentrating mask for temporary relief of allergic rhinitis symptoms as described herein.

DETAILED DESCRIPTION OF THE DRAWINGS

Figure 1:
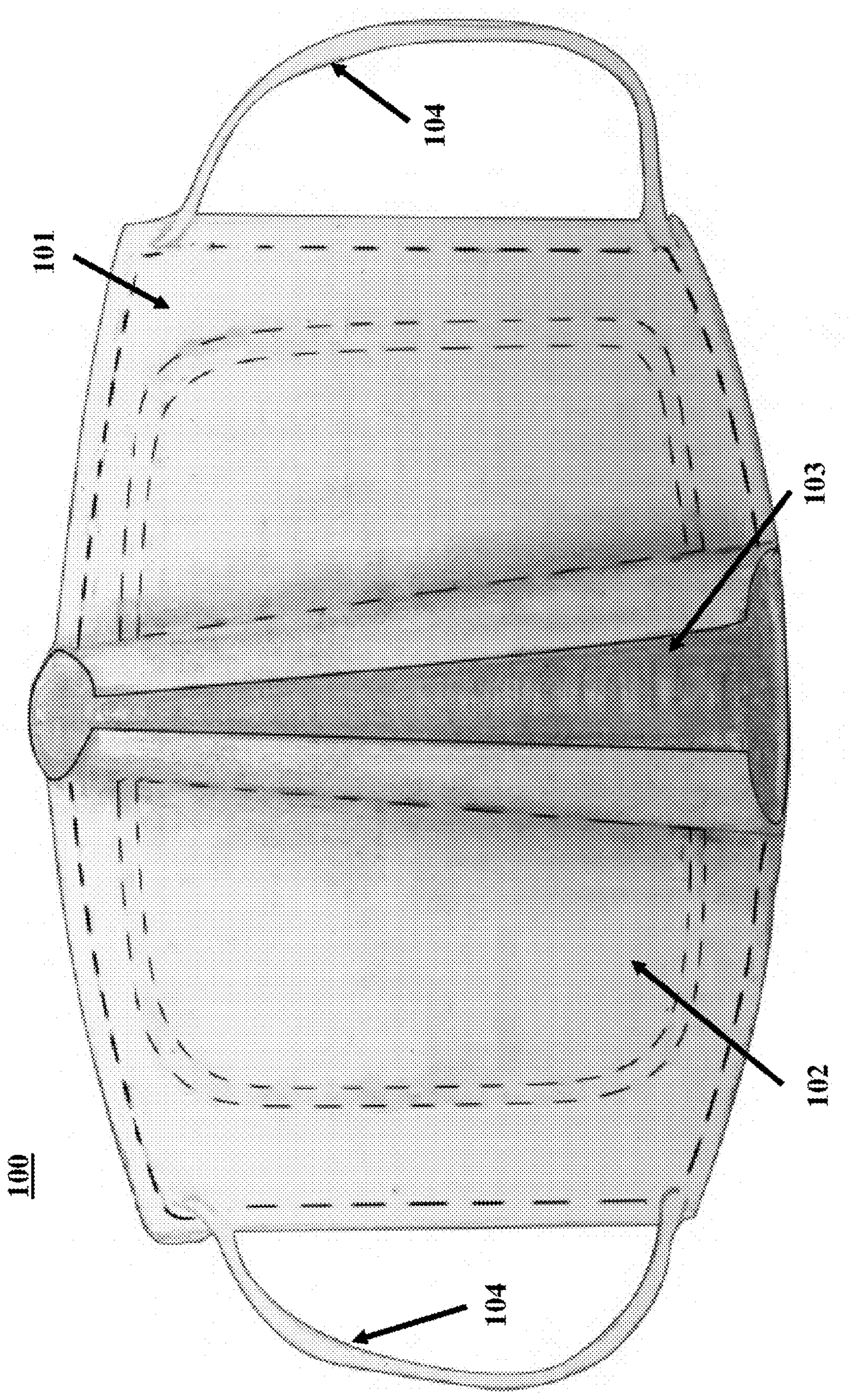
FIG. 1 is an example of an anti-fogging facemask.

This invention is described in the following description with reference to the Figures, in which like reference numbers represent the same or similar elements. While this invention is described in terms of modes for achieving this invention's objectives, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention.

Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A facemask designed to inhibit fogging of the wearer's glasses or goggles may be described herein. The mask may be comprised of an inner facemask and an outer facemask The outer facemask may form a seal at an upper portion of the wearer's nose. The inner facemask, attached to the outer facemask, may either rest on or form a seal at a lower portion of the wearer's nose and provides at least a partial barrier to prevent exhaled air from traveling through the upper end of the facemask.

The inner facemask may be made of the same material as the outer facemask or a different material all together. For example, the inner facemask may be made out of cotton and sewn onto a typical N95, KN95 or surgical outer facemask. Using cotton for the inner mask may enhance the anti-fogging properties of the outer mask by absorbing some of the exhaled moisture in addition to redirecting the exhaled air away from the upper portion of the outer facemask. The inner facemask may also contain a superabsorbing polymer (for example, sodium polyacrylate) to further enhance the anti-fogging properties. The portion of the inner facemask that forms a seal around the nose (separate from the seal formed by the outer facemask) may be comprised of a malleable plastic or metal strip, a hypoallergenic elastomer (for example, silicone), a pressure sensitive adhesive, a water absorbing or superabsorbing polymer, a hypoallergenic adhesive tape (for example, kinesiology tape or 3M Medical Tape), or an elastic band (for example, spandex) embedded in the fabric. When an adhesive tape is used as a nose piece, it may be useful to stack multiple layers of adhesive, separated by layers of release liner, to enable multiple uses. When an outermost layer of the adhesive tape is compromised, it may be peeled off to expose the next pristine adhesive layer.

The inner facemask may be designed to direct exhaled air downwards and/or towards the sides of the facemask while inhibiting airflow upwards. In one example, a flap may extend over the tip of the nose and span the width of the mask to inhibit upward airflow from both the nose and mouth. In another example, the flap may simply use gravity to rest over the wearer's nose, whereas in another example, the flap may contain a nose seal. This flap may also be designed to conform to the wearer's cheeks in addition to the nose to further inhibit upward airflow. Another example may include a simple conical funnel that is narrow towards the nose seal and widens towards the bottom of the mask. Another example may consist of a full mask, completely embedded within the outer mask that consists of an air-impermeable material towards the upper portion of the mask (near the nose) and a highly air-permeable material towards the lower portion of the mask (near the mouth/chin).

In an alternative example, the facemask may have an additional membrane layer. This additional membrane layer may have reduced CO2 permeability to help temporarily relieve symptoms of allergic rhinitis.

The concentration of CO2 in exhaled air may be approximately 3.8% (38,000 ppm), almost a 100× increase compared to ambient air. Administering a device that passively traps this exhaled CO2 near or within the nasal cavity may thus enable alleviation of allergic rhinitis without the need of compressed CO2 air cylinders. The use of a face mask with an additional member layer may help increase the concentration of inhaled CO2.

The mean inhaled air CO2 without masks may be approximately 458±21 ppm. While wearing a surgical mask, the mean CO2 may be approximately 4965±1,047 ppm (95% confidence interval 4758 to 5171 ppm), and exceeded 5000 ppm in 40.2% (30.6% to 50.4%) of the measurements (see Table 1). While wearing a respirator, the average CO2 may be approximately 9396±2254 15 ppm (8953 to 9839 ppm), and 99.0% (94.7% to 100%) of the participants showed values higher than 5000 ppm. Additionally, Table 2 illustrates sample characteristics and outcomes by age-class.

TABLE 1

Outcomes for the overall sample and results of the multiple linear regression predicting overall inhaled air CO2 in ppm (N = 102).

| | Without mask | | Surgical mask | | FFP2 respirator | |
|---|---|---|---|---|---|---|
| Mean $CO_2$ detected inside fire mask in ppm* | | | | | | |
| Mean ± SD (95% CI) | 0 ± 0 | (—) | 43099 ± 4284 | (42 257-43 940)* | 43434 ± 4426 | (42 563-44 303)* |
| Estimated inhaled air CO2 in ppm | | | | | | |
| Mean ± SD (95% CI) | 458 ± 21 | (454-462)[B] | 4985 ± 1047 | (4758-5171)* | 9396 ± 2254 | (8953-9839)* |
| >5000 ppm, % | 0.0 | | 40.2 | | 99.0 | |
| Inhaled our $CO_2$ in ppm in respiratory rate, mean ± SD (95% CI) | | | | | | |
| Slow (≤14 breaths per minute, n = 25) | 462 ± 22 | (453-471) | 4663 ± 692 | (4378-4950) | 8779 ± 1471 | (8171-9386) |
| Moderate (15-17 breaths per | 457 ± 19 | (451-463) | 4893 ± 959 | (4604-5194) | 9165 ± 2043 | (8536-9793) |
| High (≥18 breaths per minute, | 458 ± 22 | (450-465) | 5271 ± 1291 | (4820-5721) | 10143 ± 2782 | (9173-13114) |
| Coefficients for the linear regression | | | | | | |
| Respiratory rate, 1 breath per | — | | 33 | (−10: 77) | 99 | (5: 192)† |
| Low (≤14 breaths per minute, | — | | 0.00 | (Ref. cat.) | 0.00 | (Ref. cat.) |
| Moderate (15-17 breaths per minute, | — | | 261 | (−116: 638) | 431 | (−368: 1231) |
| High (<18 breaths per minute, n = 34) | | | 546 | (157, 935) | 1243 | (418; 2067) |

FFP2 = filtering face-piece grade 2 respirator.
[A] End-Tidal $CO_2$ detected inside the face masks.
[B] Only ambient air $CO_2$.
* P < 0.001 (Wilcoxon matched pairs signed-rank test) of the comparison of $CO_2$ parameters between without and with surgical or FFP2 masks.
* P < 0.05 and
* P < 0.01 from the Wald test for the linear regression adjusted by gender, age, Body Mass Index, and smoking state.

TABLE 2

Sample characteristics and outcomes by age-class.

| | Children (N = 10) | | Adults (N = 72) | | Elderly (N = 20) | |
|---|---|---|---|---|---|---|
| Mean CO2 detected inside the mask in ppm [A]. mean ± SD (95% CI) | | | | | | |
| Without masks | 0 ± 0 | (—) | 0 ± 0 | (—) | 0 ± 0 | (—) |
| With surgical mask | 40526 ± 4288 | (37459-43594) | 43604 ± 4086 | (42644-44564) | 42566 ± 4562 | (40384-44748) |
| With FFP2 respirator | 42632 ± 3732 | (39962-45301) | 43476 ± 4775 | (42354-44598) | 43684 ± 3458 | (42066-45302) |
| Inhaled air CO2 in ppm, mean ± SD (95% CI) | | | | | | |
| Without masks [B] | 457 ± 21 | (443-472) | 461 ± 18 | (457-465) | 450 ± 18 | (437-453) |
| ≥5000 ppm, % | | | | | | |

TABLE 2-continued

| Sample characteristics and outcomes by age-class. | | | |
|---|---|---|---|
| | Children (N = 10) | Adults (N = 72) | Elderly (N = 20) |
| Surgical mask | 6439 ± 1366 (5462-7415)*‡ | 4852 ± 857 (4650-5053)† | 4638 ± 948 (4194-5081)†§ |
| ≥5000 ppm, % | 90.0 | 37.5 | 25.0 |
| FFP2 respirator | 12847 ± 28898 (10774-14920) *‡ | 9056 ± 1838 (8624-9488)† | 8894 ± 1854 (8027-9762)†‡ |
| ≥5000 ppm, % | 100 | 98.5 | 100 |

FFP2 = filtering face-piece grade 2 respirator.
[A] End-Tidal $CO_2$ detected inside the face masks.
[B] Only ambient air $CO_2$.
*P < 0.01 and
†P < 0.001 (Wilcoxon matched pairs signed-rank test) for the comparison between inhaled air $CO_2$ concentration with and without surgical or FFP2 masks.
‡P < 0.001 for the comparison between children and adults, and between children and the elderly only with FFP2 respirators and
§P < 0.01 for the comparison between children and the elderly only with surgical masks (Kruskal-Walhs test).

Using an N95-like respirator (for example, the FFP2 respirator), a user may expect about a 100-fold increase in CO2 concentration in comparison to ambient air and about a 20-fold increase in inhaled CO2.

At an inhalation rate of 6 L of air/min (typical for the average human being), an N95 mask (with about 9000 ppm of inhaled CO2) may result in a 1200 ml of CO2 exposure over the course of approximately 22 minutes. Several variations of a facemask that will effectively increase the concentration of CO2 exposure within the nasal cavity are described herein. The increased concentration of CO2 exposure may be up to 100,000 ppm. This level of CO2 exposure is safe for predetermined periods of time, for example, several minutes. This increased exposure limit may be achieved, specifically within the nasal cavity, by encompassing the nose with an additional mask. This additional mask may have a low CO2 permeability membrane.

In a first example, a facemask may contain an inner section that forms a seal around the bridge of the nose and below the nostrils. This inner portion of the facemask, or respirator, may act to further increase the concentration of CO2 exhaled from the nose by acting as an additional barrier to CO2 permeation from the mask. This inner section may be comprised of a membrane or material with a reduced permeability of CO2, compared to polypropylene (the most common material used in respirators and masks). For example, polyamide-6 has a CO2/N2 permeability ratio of ~7 (averaged over several studies) compared to a permeability ratio of ~20 for polypropylene. This material may therefore, result in an increased concentration of CO2 within the mask by reducing the ratio of CO2 that permeates through the mask material with respect to N2 (the major component in exhaled breath).

In another example, a facemask or respirator design may contain no inner nose covering section, but may instead incorporate a layer of material with reduced CO2 permeation (and/or a reduced PCO2/PN2 permeation ratio) with respect to polypropylene (such as, but not limited to, polyvinylamine and copolymers, polyimides, polyethers such as polyethylene oxide and PEO copolymers, polyether-amides, polyamides, cellulose esters, and other materials common in ultra-low pressure CO2 separation membranes) within the layered nonwoven composite of the respirator or mask.

In both variations of the facemask or respirator (with or without a section that specifically covers the nose), the composition, crystallinity, thickness and/or porosity of the CO2 barrier material may be tuned to maintain sufficient oxygen/nitrogen flow to maintain a safe local air composition for continuous respiration while increasing the concentration of CO2 exposure within the nasal cavity.

The inner mask may increase a mean concentration of CO2 within the nasal cavity to above that of the outer mask. The CO2 concentration may be enhanced by at least 10% greater within the inner mask than that of the outer mask. The inner facemask may contain an additional membrane material with a CO2 permeability coefficient less than that of polypropylene at temperatures between −10 to 40° C. Alternatively, the inner facemask may contain an additional membrane material with a CO2/N2 permeability ratio less than that of polypropylene at temperatures between −10 to 40° C.

The outer mask can keep the mean concentration of CO2 to values similar to typical surgical or N95 masks, allowing for continuous safe breathing through the mouth. The inner facemask, sealed over the nose, may keep the mean concentration near the nasal cavity higher.

For a lower permeability membrane, there may be several options to effectively increase the CO2 concentration. For example, a thicker material may be used, which does not necessarily have lower permeability, but because of increased thickness has lower permeance. In another example, a material that has a lower permeability ratio (PCO2/PN2) than a typical mask material, such as polypropylene, may be used. Having a lower relative permeability (PCO2/PN2) may effectively let N2 pass more easily through the mask and therefore effectively reduce the amount of CO2 that passes at any moment. An upper limit of PCO2/PN2 may be about 25. In another example, the upper absolute limit of PCO2 may be about 100 ml mm cm/(cm2 s Hg) at 30° C.

Additionally, certain essential oils may have anti-inflammatory effects and reduce the symptoms of patients with allergic rhinitis. In another example, the facemask or respirator may consist of essential oils infused into one or more layers of the mask (which may, but do not need to, contain an inner nose covering or an additional CO2 barrier layer) to help alleviate symptoms of allergic rhinitis. For example, the essentials oils may include *eucalyptus, Ravensara*, frankincense, menthol, sandalwood, lavender, peppermint oil, tea tree oil, lemon, chamomile, or the like.

FIG. 1 is an example of an anti-fogging facemask. The anti-fogging facemask 100 includes an outer facemask 101 and an inner facemask 102. The inner facemask 102 of the anti-fogging facemask 100 includes a breathing funnel 103. The anti-fogging facemask 100 includes ear loops 104.

Figure 2:
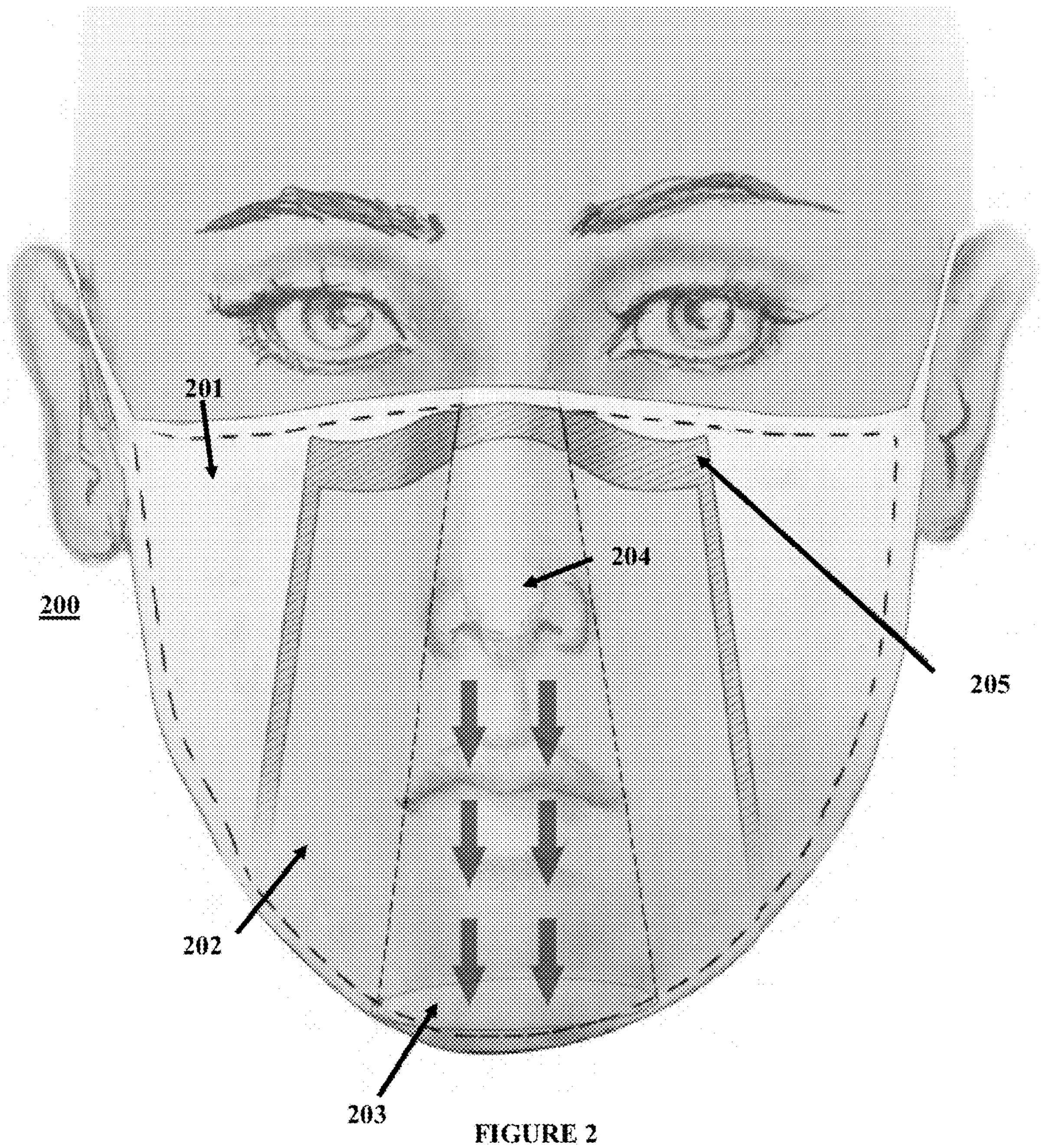
FIG. 2 is an example of the anti-fogging facemask worn on the face of a user.

FIG. 2 is an example of the anti-fogging facemask worn on the face of a user. The anti-fogging facemask 200 includes an outer facemask 201 and an inner facemask 202 As illustrated in FIG. 2, the inner facemask 201 forms a seal around the nose 204. The inner facemask 201 may be comprised of a malleable plastic or metal strip, a hypoallergenic elastomer (for example, silicone), a pressure sensitive adhesive, a water absorbing or superabsorbing polymer, a hypoallergenic adhesive tape (for example, kinesiology tape or 3M Medical Tape), an elastic band (for example, spandex) 205 embedded in the fabric, or a material with lower CO2 permeability than the outer facemask. Additionally, as illustrated in FIG. 2, the inner facemask may be designed to direct exhaled air downwards 203.

Figure 3:
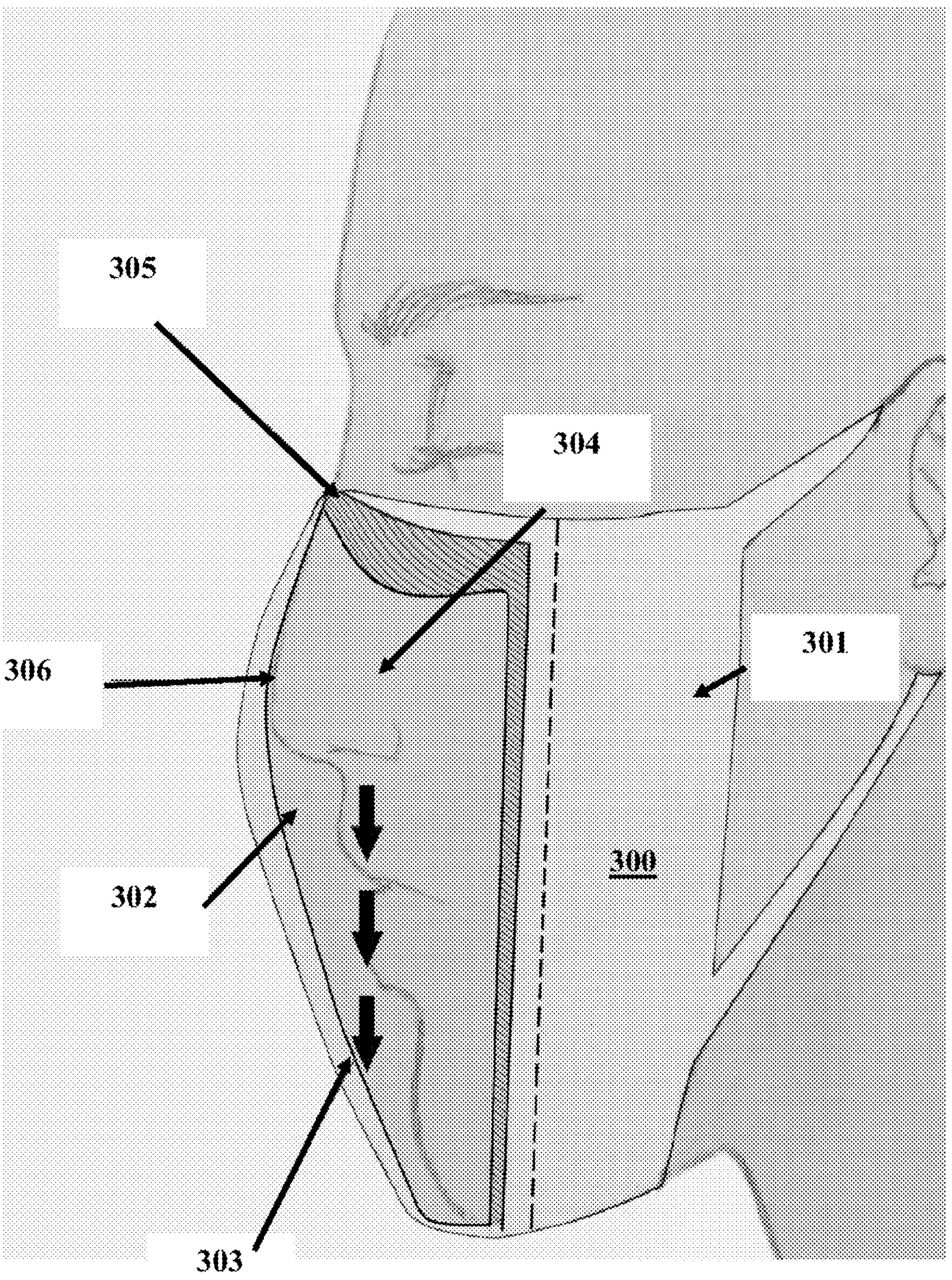
FIG. 3 is an example profile of the anti-fogging facemask worn on the face of the user.

FIG. 3 is an example profile of the anti-fogging facemask worn on the face of the user. The anti-fogging facemask 300 includes an outer facemask 301 and an inner facemask 302. The inner facemask 302 may have an adhesive 305 to adhere to the bridge of the nose 304 of the wearer. The inner facemask 302 may be designed to direct exhaled air downwards 303. The anti-fogging facemask may also include a breathing funnel 306. The breathing funnel 306 may get wider towers the lower end of the inner facemask 302 to promote downward airflow.

Figure 4:
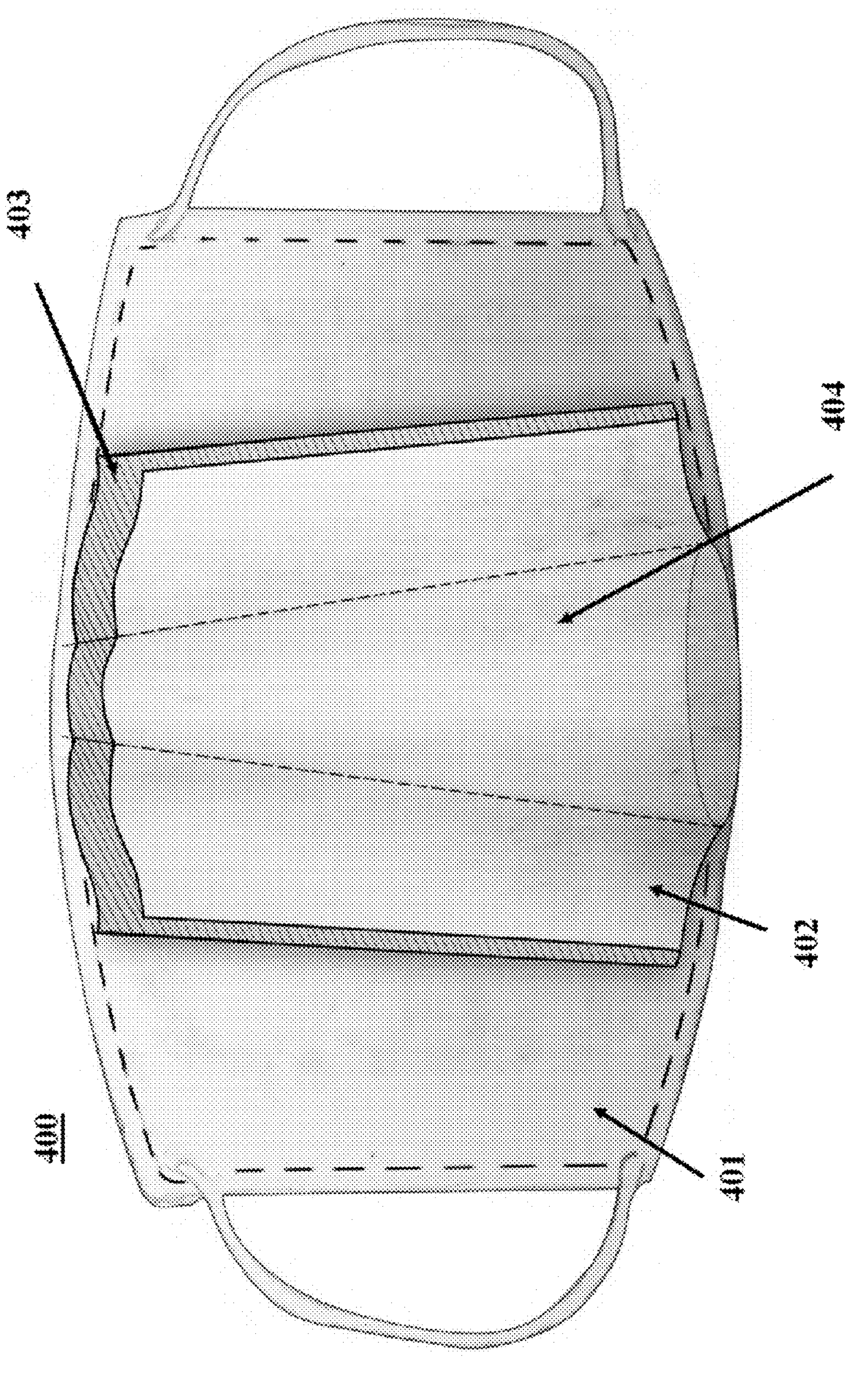
FIG. 4 is an example of the inside of the anti-fogging facemask.

FIG. 4 is an example of the inside of the anti-fogging facemask. The anti-fogging mask 400 includes an outer facemask 401 and an inner facemask 402. The inner facemask 402 may have an adhesive 403 to adhere to the bridge of the nose of the wearer. The anti-fogging facemask may also include a breathing insert 404. The breathing insert 404 may be a flap.

Figure 5:
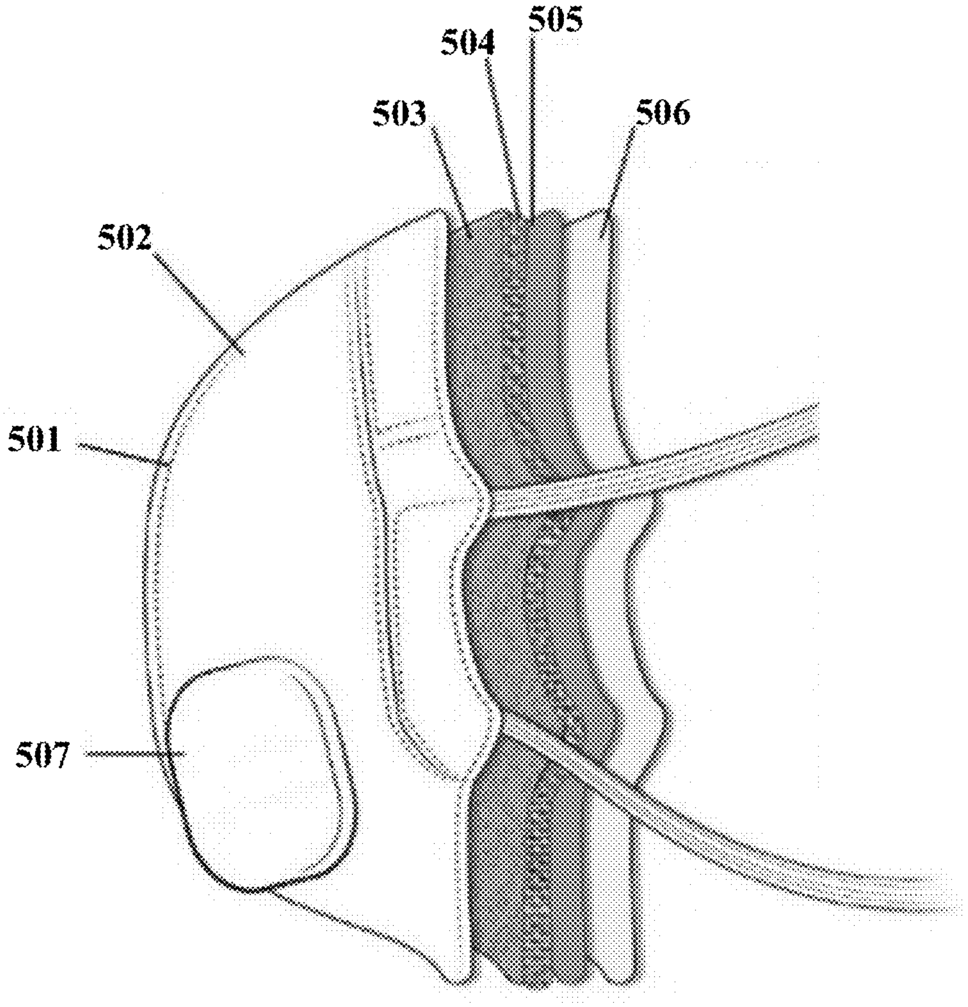
FIG. 5 is an example of the anti-fogging facemask with a reduced CO2 permeability layer.

FIG. 5 is an example of the anti-fogging facemask with a reduced CO2 permeability layer. The antifogging facemask 500 may include a respirator mask 501, a mask outer layer facemask 502, a filter layer 503, an additional membrane layer 504, a support layer 505, and a mask inner layer 506. The respirator mask 501 may include a ventilator fan 507. The mask outer layer 502 may be comprised of non-woven polypropylene. The filter layer 503 may be comprised of non-woven melt blown polypropylene. The additional membrane layer 504 may be comprised of a non-woven polypropylene. The support layer 505 may be comprised of modacrylic. The mask inner layer 506 may be comprised of a non-woven polypropylene. The membrane layer 504 may have reduced CO2 permeability.

Those of ordinary skill in the art may recognize that many modifications and variations of the above may be implemented without departing from the spirit or scope of the following claims. Thus, it is intended that the following claims cover the modifications and variations provided they come within the scope of the appended claims and their equivalents.

What is claimed:

1. An anti-fogging facemask comprising:

an outer facemask;

an inner facemask, wherein the inner facemask is attached to the outer facemask; and the inner facemask retains a portion of CO2 from exhaled breath such that the mean concentration of CO2 within the inner facemask is at least 10% greater than the mean concentration of CO2 within the outer facemask when used by a human adult.

2. The anti-fogging facemask of claim 1, wherein the inner facemask is configured to form a seal around the entire circumference of the human adult's nose.

3. The anti-fogging facemask of claim 1, wherein the inner facemask contains an additional membrane material with a CO2 permeability coefficient less than that of polypropylene at temperatures between −10 to 40° C.

4. The anti-fogging facemask of claim 3, further comprising an insert that is configured to extend over the tip of the nose and spans the width of the mask.

5. The anti-fogging facemask of claim 4, wherein the insert inhibits upward airflow from both the nose and mouth.

6. The anti-fogging facemask of claim 1, wherein the inner facemask contains an additional membrane material with a CO2/N2 permeability ratio less than that of polypropylene at temperatures between −10 to 40° C.

7. The anti-fogging facemask of claim 1, further comprising:

a membrane layer, wherein the membrane layer has reduced CO2 permeability as compared to propylene;

wherein the inner facemask provides a barrier to prevent exhaled air from traveling through an upper end of the anti-fogging facemask and directs exhaled air downwards;

wherein both the outer facemask and the inner facemask are configured to form a seal at an upper portion of the human adult's nose.

8. The anti-fogging facemask of claim 7, wherein the seal of the inner facemask is made of cotton and includes an adhesive.

9. The anti-fogging facemask of claim 7, further comprising a conical funnel that is narrow towards the nose seal and widens at the bottom of the mask towards the mouth.

10. The anti-fogging facemask of claim 7, wherein the membrane layer has a CO2/N2 permeability ratio of about 25.

11. The anti-fogging facemask of claim 7, wherein the membrane layer is comprised of at least one of a polyvinylamine and copolymers, polyimides, polyethers, polyether-amides, polyamides, and cellulose esters.

12. The anti-fogging facemask of claim 1, further comprising a full mask, completely embedded within the outer facemask.

13. The anti-fogging facemask of claim 12, wherein the full mask includes an air-impermeable material towards an upper portion of the mask and a highly air-permeable material towards a lower portion of the mask.

14. The anti-fogging facemask of claim 1, wherein the CO2 concentration within the inner mask is 5000 to 100,00 ppm within about 1 mm from the nasal cavity.

15. The anti-fogging facemask of claim 1, further comprising a ventilator fan embedded within the outer facemask.

16. A respirator mask comprising:

an outer facemask; and a membrane layer, wherein the membrane layer has reduced CO2 permeability as compared to polypropylene;

wherein the outer facemask is configured to form a seal at an upper portion of a wearer's nose;

wherein the membrane layer has a CO2/N2 permeability ratio of less than 25.

17. The respirator mask of claim 16, wherein the CO2 concentration within the inner mask is 8953 to 9839 ppm.

* * * * *